S. NULL.
Hominy Machine.
No. 8,972.
Patented May 25, 1852.
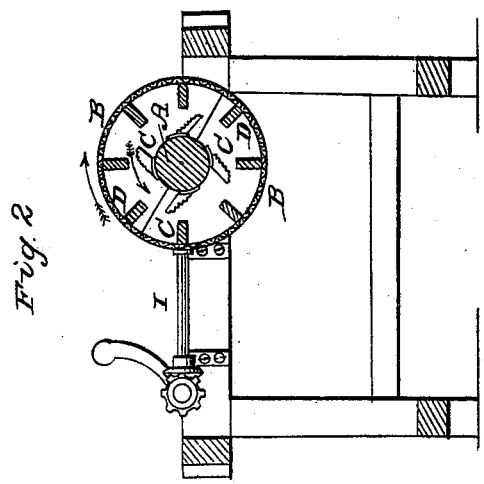
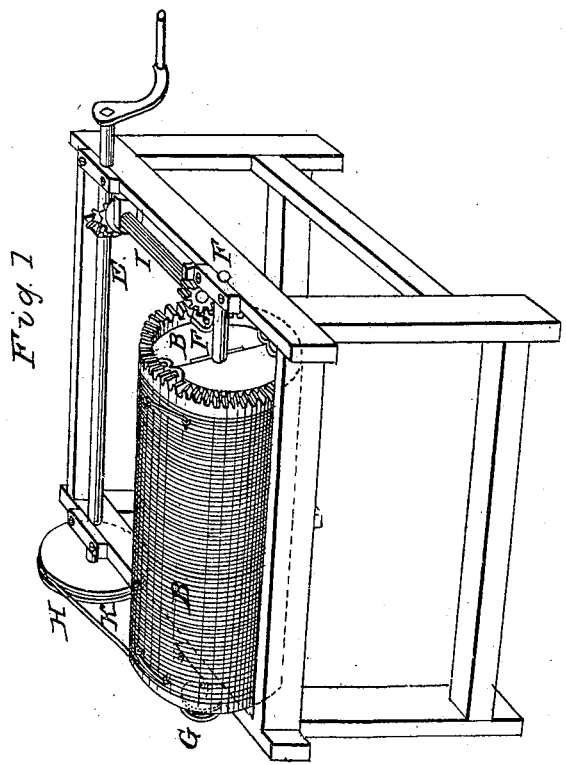

UNITED STATES PATENT OFFICE.

SAMUEL NULL, OF CARROLL COUNTY, MARYLAND.

HOMINY-MACHINE.

Specification of Letters Patent No. 8,972, dated May 25, 1852.

*To all whom it may concern:*

Be it known that I, SAMUEL NULL, of Carroll county, in the State of Maryland, have invented a new and useful Improvement in Machines for Making Hominy, Clearing Grain, &c.; and I do hereby declare that the following is a full and exact description thereof, reference being had to the letters of reference marked thereon, the same letters applying in both figures.

Figure 1 is a perspective view of the machine; A, a solid cylinder, seen in Fig. 2; B, B, the rotary concave; C C, the saws, spikes or beaters on the cylinder; D D, slats, flights or beaters inside the concave; E, the propelling shaft; F, the shaft passing through and united to the cylinder A; G, the pulley on the end of the shaft F; H, the pulley on the propelling shaft; I, the lateral shaft; K, the band; Fig. 2, a vertical section of the same machine.

The arrows show the direction of the movement of the cylinder and concave.

My invention consists in constructing and giving motion to a cylinder or concave, covered with wire gauze of a suitable mesh for the exit of impurities, said concave provided with slats, flights, or beaters attached to the inside thereof. This rotary cylinder or concave, surrounds a solid cylinder likewise rotary, (but in opposite direction) furnished with saw teeth, spikes, or beaters, which being rapidly driven through the corn placed inside of the concave or outer cylinder will divest it of the exterior covering or husk, by the action of the saws or beaters on the corn, thrown in a continuous stream against them, by the flights, slats, or beaters on the exterior cylinder, which by suitable gearing is driven in an opposite direction to that of the inner cylinder. In this manner the grains of corn are preserved from being broken too much and prevent loss in its conversion into hominy, as all that is desired in its manufacture is the removal of the chit or soft portion and divesting it of the husk. If the concave were stationary the corn would merely be broken by the saws or spikes. The novelty I wish to be understood is in giving contrary motion to the concave to that of the cylinder provided with saws, and in providing the concave or outer cylinder with slats or flights to throw the corn against the saws, and constantly change the position of the corn.

To enable others skilled in the art to make and use my invention, I will proceed to describe the construction and operation of the same.

Said machine consists of a solid cylinder A, placed inside of a rotary reticulated cylindrical concave B B, of a proper mesh for the purpose of cleaning the corn or grain, after it has been acted on by the saws C C or spikes or beaters on the cylinder A which hulls or clears the grain by the contra movement of the cylinder inside of the rotary concave. The slats flights or beaters D D placed inside and attached to the concave B B, continuously carry up and empty the grain upon the cylinder A. The motion of the cylinder A is produced by the action of the band K upon the pulley G placed on the extended end of the shaft F on which the cylinder revolves, said pulley G being driven by the pulley H on the end of the extended propelling shaft E. The accelerated motion of the cylinder is produced by increasing the proportions of the pulley H to that of G. The contrary motion of the rotary concave is produced by the action of the gearing upon the lateral shaft I, it operating upon the gearing on the head of the concave on the near side thereof, said concave B turning freely upon the shaft F of the cylinder A and its motion retarded by increasing the proportion in number of cogs on the head of the concave to that of the cog wheel on the end of the lateral shaft I. The motion communicated by the band K between the two pulleys G and H drives the cylinder A to the right and the action of the gearing on the concave head turns it to the left and at a slower speed, thus offering by means of the slats or beaters D D resistance to the saws, spikes or beaters placed on the solid cylinder by which the corn is cleared of the husk and made hominy, and the grain of the chit or soft portion, the screen B permitting the impurities to fall through its meshes.

What I claim by my invention and desire to secure by Letters Patent, is—

The combination of the beaters C, C, with the beaters D D each set moving in opposite directions as set forth in the foregoing specification substantially, and for the purposes therein noticed.

In testimony whereof I have hereunto signed my name before two subscribing witnesses.

SAMUEL NULL.

Witnesses:
WILLIAM RUDISEL,
JAS. RODGERS.